(12) United States Patent
Messenger (10) Patent No.: US 10,902,069 B2
(45) Date of Patent: Jan. 26, 2021

(54) DISTRIBUTED INDEXING AND AGGREGATION

(71) Applicant: Runtime Collective Limited, Brighton (GB)

(72) Inventor: Philip Messenger, Brighton (GB)

(73) Assignee: RUNTIME COLLECTIVE LIMITED, Brighton (GB)

( * ) Notice: Subject to any disclaimer, the term of this patent is extended or adjusted under 35 U.S.C. 154(b) by 126 days.

(21) Appl. No.: 16/230,074

(22) Filed: Dec. 21, 2018

(65) Prior Publication Data

US 2020/0192947 A1 Jun. 18, 2020

Related U.S. Application Data

(60) Provisional application No. 62/781,408, filed on Dec. 18, 2018.

(51) Int. Cl.
| | | |
|---|---|---|
| *G06F 16/951* | (2019.01) | |
| *G06F 16/9536* | (2019.01) | |
| *G06F 16/9538* | (2019.01) | |
| *G06F 16/903* | (2019.01) | |
| *G06F 16/906* | (2019.01) | |

(52) U.S. Cl.
CPC .......... *G06F 16/951* (2019.01); *G06F 16/906* (2019.01); *G06F 16/90335* (2019.01); *G06F 16/9536* (2019.01); *G06F 16/9538* (2019.01)

(58) Field of Classification Search
CPC ............. G06F 16/951; G06F 16/9536; G06F 16/9538; G06F 16/90335; G06F 16/906
USPC ........................................................ 707/713
See application file for complete search history.

(56) References Cited

U.S. PATENT DOCUMENTS

| | | | |
|---|---|---|---|
| 7,761,407 B1 | 7/2010 | Stern | |
| 9,053,160 B2 | 6/2015 | Lanphear et al. | |
| 2005/0177553 A1 | 8/2005 | Berger et al. | |
| 2014/0195558 A1* | 7/2014 | Murthy | G06F 16/951 707/770 |
| 2015/0100661 A1* | 4/2015 | Heise | H04L 67/2842 709/213 |

(Continued)

FOREIGN PATENT DOCUMENTS

| | | |
|---|---|---|
| CN | 105589951 A | 5/2016 |
| CN | 104866608 B | 1/2018 |

OTHER PUBLICATIONS

Arkhipov et al., "Sorting with GPUs: A Survey", Sep. 8, 2017.
Zhang et al., "Large-Scale Spatial Data Processing on GPUs and GPU-Accelerated Clusters", Nov. 2014.

*Primary Examiner* — Michael Pham
(74) *Attorney, Agent, or Firm* — Mintz, Levin, Cohn, Ferris, Glovsky and Popeo, P.C.

(57) ABSTRACT

Data characterizing a query of a social media dataset can be received. The query can be executed utilizing a distributed processing cluster. The distributed processing cluster can include a plurality of nodes. At least one node can execute a first query on a partition of a tablespace storing a portion of the social media dataset. The partition can include a data source that can include a fixed width unique identifier and a stored field. The fixed width unique identifier can be associated with a respective record of the social media dataset and the stored field can include a portion of the respective record. A result of the query can be provided. Related apparatus, systems, techniques and articles are also described.

18 Claims, 6 Drawing Sheets

(56) References Cited

U.S. PATENT DOCUMENTS

| | | | |
|---|---|---|---|
| 2016/0026684 A1* | 1/2016 | Mukherjee | G06F 3/067 |
| | | | 707/713 |
| 2016/0306668 A1 | 10/2016 | Heil et al. | |
| 2017/0103092 A1* | 4/2017 | Hu | G06F 16/278 |
| 2017/0147683 A1 | 5/2017 | Patterson | |
| 2017/0235788 A1 | 8/2017 | Borisyuk et al. | |
| 2018/0101528 A1 | 4/2018 | Patterson | |

\* cited by examiner

DISTRIBUTED INDEXING AND AGGREGATION

RELATED APPLICATION

This application claims priority under 35 U.S.C. § 119(e) to U.S. Provisional Application No. 62/781,408 filed Dec. 18, 2018, entitled "Distributed Indexing and Aggregation", the entire content of which is hereby expressly incorporated by reference herein.

TECHNICAL FIELD

The subject matter described herein relates to distributed systems, for example, a distributed indexing and aggregation system.

BACKGROUND

Social media networks can include vast amounts of data. Moreover, social networks can be dynamic with new interactions occurring and communities changing over even a short period of time. But the computational requirements to perform searches over the social media dataset can be prohibitive thereby limiting processing and understanding of these large and dynamic datasets.

SUMMARY

In an aspect, data characterizing a query of a social media dataset can be received. The query can be executed utilizing a distributed processing cluster. The distributed processing cluster can include a plurality of nodes. At least one node can execute a first query on a partition of a tablespace storing a portion of the social media dataset. The partition can include a data source that can include a fixed width unique identifier and a stored field. The fixed width unique identifier can be associated with a respective record of the social media dataset and the stored field can include a portion of the respective record. A result of the query can be provided.

One or more of the following features can be included in any feasible combination. For example, a first record can be received by a first node of the plurality of nodes. The first node can determine a first fixed width unique identifier and a first stored field for the first record. The first node can provide the first fixed width unique identifier and the first stored field to a second node. The second node can create a first data source in a first partition in a first tablespace of the social media dataset. The second node can store the first fixed width unique identifier and the first stored field in the first data source.

The first query can be received by a query proxy. The query proxy can determine a query execution plan of the first query. The query execution plan can include a second query. The query proxy can transmit the second query to a second node of the distributed processing cluster. The query proxy can receive a first result of the executed query. The query proxy can provide the result of the query, wherein the result of the query can include the first result.

The first query can include data characterizing a first attribute, a second attribute, and a first binary operation between the first attribute and the second attribute. Data characterizing a first index corresponding to the first attribute and a second index corresponding to the second attribute can be received. A third index can be determined at least by executing the first binary operation between the first index and the second index. The result of the query can include the third index.

The distributed processing cluster can include at least one graphics processing unit.

The data source including the fixed width unique identifier and the stored field can be maintained in a memory.

The data source can include at least one record, at least one field including a field type, at least one index mapped to one or more fields of the at least one field, and one or more stored field including a portion of a record of the at least one record.

The at least one indexes include a bitmap index, a free text search index, an interval index, and/or a log structured merge tree index.

A range of records from a first interval index can be identified. A first fixed width unique identifier vector and a first timestamp vector of the range of records can be copied to a memory. The first fixed width unique identifier vector and the first timestamp vector can be copied to a graphics processing unit of the distributed processing cluster. The first fixed width unique identifier vector and the first timestamp vector can be filtered by timestamp and at least one entry lying outside an expected time range can be pruned. The timestamp vector can be discarded. The pruned first fixed width unique identifier vector can be sorted in place. The sorted first fixed width unique identifier vector can be reduced. The reducing can include counting a number of duplicates of a first fixed width unique identifier in the first fixed width unique identifier vector. A second fixed width unique identifier vector and a count vector can be created. The second fixed width unique identifier vector can include the reduced sorted first fixed width unique identifier vector, and the count vector can include the number of duplicates of the first fixed width unique identifier. The second fixed width unique identifier vector can be sorted by utilizing the count vector. A predetermined length prefix of the sorted second fixed width unique identifier vector can be provided.

A first value vector including a plurality of values can be created. A minimum value of the first value vector, a maximum value of the first value vector, and a number of histogram bins corresponding to a number of unique values in the first value vector can be calculated in parallel. The plurality of values in the first value vector can be transformed into respective histogram bin values in place and in parallel. The transformed first value vector can be sorted. A plurality of end indices of the histogram bin values in the transformed first value vector can be computed in parallel. An end index vector including the plurality of end indices of the histogram bin values can be created. A difference between adjacent entries of the end index vector can be calculated returning a bin count vector. The bin count vector can be provided.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Social media data can include entities (e.g., profiles, tweets, shared content, followers, interactions, and/or the like) and associated metadata, for example, a twitter profile can include tweets and each tweet can include shared content (e.g., a URL that can be crawled and/or scraped). Social media datasets can include social media data and can be retrieved for many entities (e.g., 500 million profiles, 20 billion tweets, 10 billion items of shared content, 20 billion followers, 50 billion interactions, and/or the like). In addition, entities can be updated, inserted, and/or deleted frequently (e.g., 500 profile updates per second, 5,000 tweet insertions per second, 1,000 shared content URLs crawled per second, 10,000 interaction insertions per second, and/or the like).

A modern central processing unit (CPU) can sort around 40 million integers per second per core. On datasets including billions of integers, sorting can take substantial time to execute. For example, a CPU can sort a billion integers in 25 seconds. Likewise, an aggregation of a result of a query including billions of entities (e.g., records) can take tens of seconds. And the more complicated the query (e.g., a complex nested query), the longer that query can take to execute. It can be desirable for these operations (e.g., queries, aggregations, sorts, scans, and/or the like) to execute in real time.

Some implementations of the current subject matter can include distributed indexing, querying, and/or aggregations using distributed processing clusters that can facilitate the execution of large dataset operations (e.g., queries, aggregations, sorts, scans, and/or the like). In order to enable completion of the indexing, querying, and/or aggregation within a feasible amount of time (e.g., within seconds, or less), the distributed processing cluster can store portions of data records that can belong to large data sets and execute nested queries and/or aggregations on that data. A full record can be stored elsewhere, for example, in a distributed key/value store.

Some implementations of the current subject matter can work with partionable datasets. Partionable datasets can include datasets that can be split into multiple independent portions. Records in different portions can have no dependency between them. For example, social media data sets can be partionable.

Figure 1:
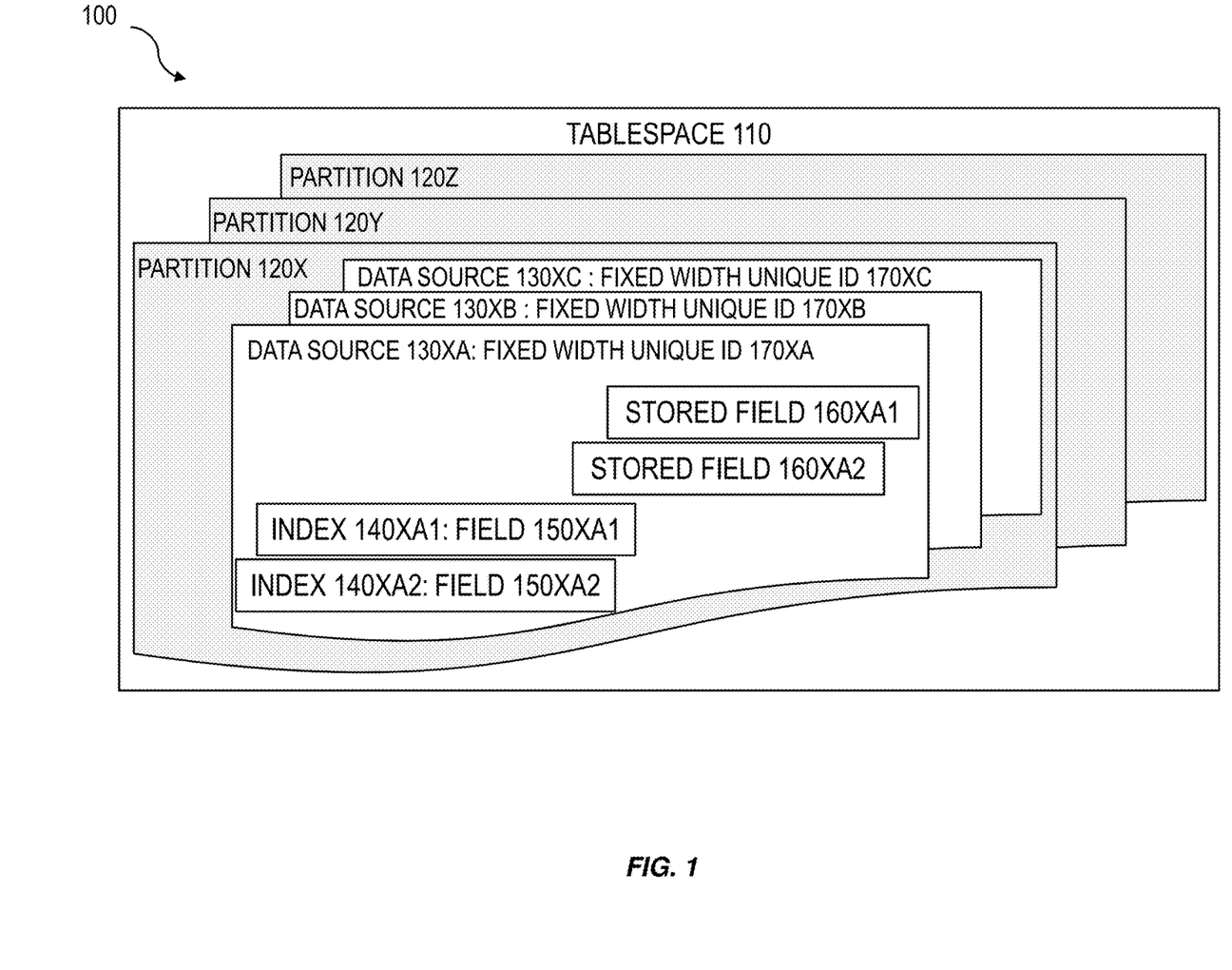
FIG. 1 is a diagram illustrating an example implementation of a data model.

FIG. 1 is a diagram illustrating an example data model 100 that can facilitate storing partial records of partionable datasets, such as portions of social media dataset records. The data model can include a tablespace, a partition, a data source, a record, a field, an index, a stored field, and a fixed width unique identifier (ID). By utilizing data sources including fixed width unique IDs and stored fields, querying large and dynamic partionable datasets, such as social media datasets, can be facilitated.

In some implementations, related social media dataset records can be grouped into a tablespace 110. The tablespace 110 can act as a container for related data and data structures. The tablespace 110 can include an ID associated with the tablespace 110. For example, the tablespace 110 can be split into partitions 120 (e.g., partition 120X, partition 120Y, and partition 120Z) and can include one or more partition 120. In turn, tablespaces 110 and/or partitions 120 can be replicated across the distributed processing cluster. For example, a tablespace 110 can facilitate distinguishing between partitions 120 with similar identifiers but different origins (e.g., different machine, node, address space, and/or the like). Replicates of partition 120, in such an example, can be included in tablespaces 110 in different locations (e.g., different machine, node, address space, and/or the like).

As discussed above, multiple instances of a partition 120 can exist in the distributed processing cluster. The multiple instances can provide resiliency (e.g., capacity of the distributed processing cluster to recover from disaster, such as machine failure, network failure, outages, intermittent outages, malfunctioning nodes, and/or the like). In addition, they can provide scalability (e.g., the ability to handle a growing amount of work, potential to be enlarged to accommodate growth, and/or the like). The number of partitions 120 can determine the number of simultaneous threads for parallel execution of a query (e.g., a first query, a second query, and/or the like) and/or aggregation (e.g., top-n, histogram, and/or the like).

A partition 120 can include one or more data sources 130. A data source 130 can include one or more records. In some implementations, a data source 130 can include a portion of at least one record. A record can include a fixed width unique ID 170. For example, the fixed width unique ID 170 can include a unique integer from a monotonically increasing sequence. In some implementations, the unique integer from a monotonically increasing sequence can include a fixed width (e.g., a representation including a fixed number of bytes, such as 1 byte, 2 bytes, 3 bytes, 16 bytes, 32 bytes, 64 bytes, 128 bytes, 256 bytes, other integer values, and/or the like).

The data source 130 can include one or more fields 150. A field 150 can have a type. For example, field types can include string, integer, datetime, geolocation, and/or the like. The data source 130 can include one or more indexes 140 (e.g., index 140XA1, index 140XA2, and/or the like). An index 140 can improve record lookup performance, for example, during execution of a query. An index 140 can be mapped to one or more fields 150 and can include an identifier, address, link, pointer, and/or the like to the field 150.

The data source 130 can include one or more stored fields 160. A stored field 160 can include a portion of the record, such as a fragment of a full record. The portion of the record included in the stored field 160 can be utilized to execute a query of large and dynamic social media datasets. The stored fields 160 can be utilized to sort a result of the query and/or perform (e.g., calculate) aggregations. Stored fields 160 and indexes 140 can include attributes (e.g., first attribute, second attribute, and/or the like).

For example, a record can include a tweet. A data source 130 can include a portion of the tweet. For example, a tweet can include a timestamp field that can be represented as a 64 bit integer. The timestamp from each tweet can be appended to a contiguous sequence of these timestamps. The portion of the tweet included in the data source 130 can include an ID (e.g., a tweet ID), a profile ID associated with the profile tweeting the tweet, a body of the tweet, and/or the like. Other portions of the tweet can include coordinates, a place, a location (e.g., a location of the device at the time a tweet was transmitted), a time stamp, a mention, a retweet, a hash tag, and/or the like. The ID and profile ID can be included in stored fields 160, and the body of the tweet can be included in indexes 140. The data source 130 can be included in a partition 120. A partition key can include the profile ID and can associate the data source 130 with the partition 120.

In another example, a record can include a twitter profile. A data source 130 can include a portion of the twitter profile. The portion of the twitter profile included in the data source 130 can include an ID (e.g., a profile ID), an influence score, a biography, a location (e.g., a profile location), a gender, and/or the like. Other portions of the profile can include a name, a screen name, a URL, a description, a verification flag, a followers count, a friends count, a listed count, a favourites count, a statuses count, a profile creation date, a language, a time zone, various user interface elements (e.g., background color, banner URL, profile picture URL, and/or the like), and/or the like. The ID and influence score can be included in stored fields 160, and the biography, location, and gender can be included in indexes 140. The data source 130 can be included in a partition 120. A partition key can include the ID and can associate the data source 130 with the partition 120.

Figure 2:
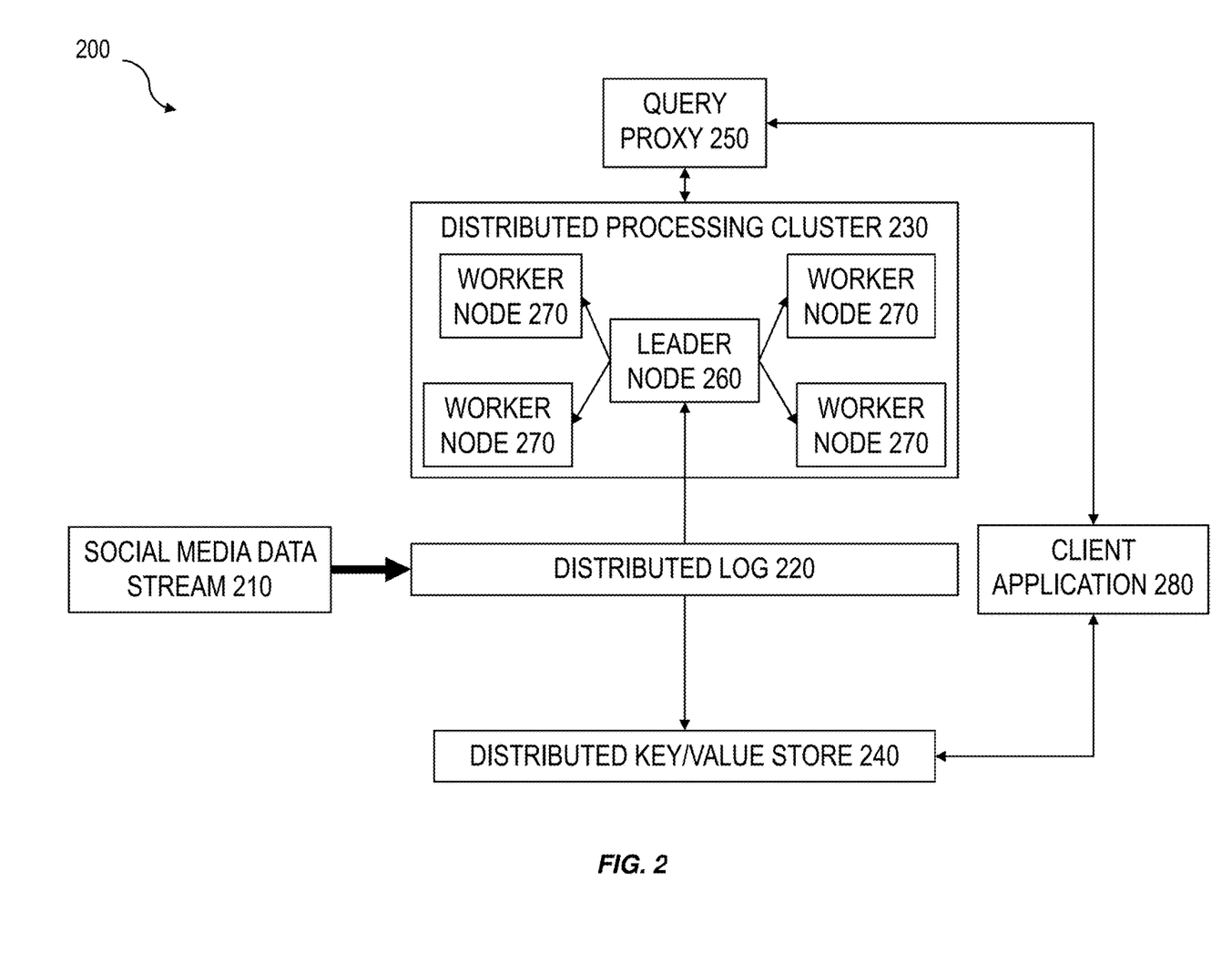
FIG. 2 is a system block diagram illustrating an example system that facilitates indexing and querying of social media datasets.

FIG. 2 is a system block diagram illustrating an example operating environment 200 that can facilitate storing, indexing, querying, and aggregating a social media data stream in accordance with some implementations of the current subject matter. It can facilitate receiving large volumes of social media data records from a social media data stream and storing and indexing the social media data records in a dynamic social media dataset. Furthermore, it can facilitate querying and aggregating the social media dataset in real time (e.g., within seconds or faster). By utilizing data sources 130 including fixed width unique IDs 170 and stored fields 160, the operating environment 200 can facilitate querying large and dynamic social media datasets. The operating environment 200 can include a social media data stream, a distributed log, a distributed processing cluster, a distributed key/value store, and a query proxy.

Social media data records can be received regularly from a social media data stream 210 and can include entities (e.g., profiles, tweets, shared content, followers, interactions, and/ or the like). For example, 100,000 entities can be received every second. When a social media data record is received, it can be assigned a fixed width unique ID 170, such as a unique integer ID from a monotonically increasing sequence, referred to as an ordinal. The ordinal can uniquely identify a specific record.

The records can be received by the distributed log 220. The distributed log 220 (e.g., APACHE KAFKA) can receive social media data records from the social media data stream 210. For example, records can be received by the distributed log 220 as JavaScript Object Notation (JSON) objects from the social media data stream 210. It can transmit full records to distributed key/value stores 240. The social media data stream 210 can, for example, publish to data sources 130 on the distributed log 220. Social media data records can be stored in a distributed log 220. Full social media data records can be stored in the distributed key/value store 240 (e.g., CASSANDRA, MONGODB, BIGTABLE, HBASE, COUCHBASE, IGNITE, and/or the like).

The distributed log 220 can transmit partial records to the distributed processing cluster 230. Partial social media data records can be stored in memory (e.g., 120 GB/s bandwidth) in the distributed processing cluster 230. The distributed processing cluster 230 can include one or more nodes. The one or more nodes can include a leader node 260 (e.g., first node) and one or more worker nodes 270 (e.g., second node). In some implementations the distributed processing cluster 230 can include one node, and that node can act as both a leader node 260 and a worker node 270. In some implementations the distributed processing cluster 230 can include two nodes. In such an implementation, a first node can act as the leader node 260, and a second node can act as a worker node 270.

A single node can be designated (e.g., through leader election) as a leader node 260. The leader node 260 can facilitate coordination of the distributed processing cluster 230. For example, the leader node 260 can assign tablespaces 110 and partitions 120 to worker nodes 270. If the leader node 260 fails, a replacement leader node 260 can be elected from the remaining nodes in the distributed processing cluster 230. If a worker node 270 fails, the remaining nodes in the distributed processing cluster 230 can take over a share of the data that was managed by the failed node (e.g., through coordination by the leader node 270). This can enable, for example, high availability (e.g., a request gets a response on success/failure).

Worker nodes 270 can execute queries and/or aggregations. A query can return fixed width unique IDs 170 of entities corresponding to the result of the query. The fixed width unique IDs 170 in the result of the query can be sorted by stored fields 160 corresponding to the records that can be identified by the fixed width unique IDs 170. An aggregation can include a query, execute the query and use the stored fields 160 associated with each corresponding record in a result of the query to calculate a summary view of the result of the query. For example, an aggregation can include the top-n items corresponding to an attribute or can generate a histogram.

In operation, a query (e.g., first query) can be received by a query proxy 250. The query can be received by the query proxy 250 from a client application 280. The query proxy 250 can facilitate the execution of queries and aggregations. For example, the query proxy 250 can coordinate execution of queries and/or aggregations. The query proxy 250 can parse the query and determine a query execution plan of the query. For example, the query and/or aggregation can include a cost (e.g., time cost, space cost, resources cost, and/or the like) of performing (e.g., executing) various query and/or aggregation operations. The query execution plan can minimize the cost of executing the query and/or aggregation. Furthermore, some operations can have a high cost, but executing those operations can reduce the cost of subsequent operations (e.g., multi-operation awareness). The query proxy 250 can determine the query execution plan including a second query. The query proxy 250 can transmit (e.g., dispatch) partial queries (e.g., second query) and aggregations to one or more node (e.g., second node) in the distributed processing cluster 230. The query proxy 250 can receive a result (e.g., first result) of the query (e.g., second query) executed by the node (e.g., second node) and can provide the result (e.g., including the first result of the second query executed by the second node) of the query (e.g., first query).

Figure 4:
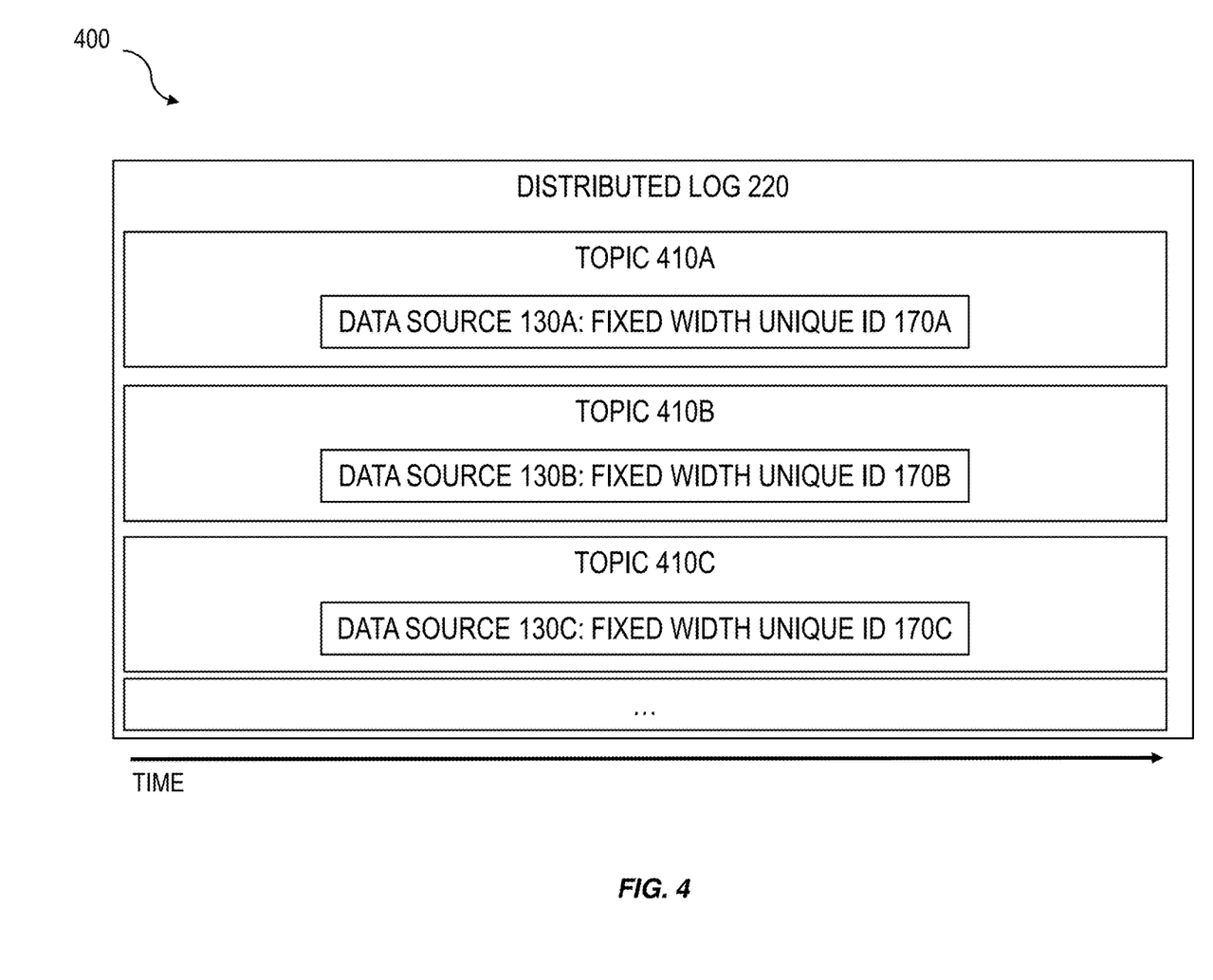
FIG. 4 is a diagram illustrating an example implementation of a distributed log.

FIG. 4 is a diagram illustrating an example implementation 400 of the distributed log 220. In implementation 400, data sources 130 including fixed width unique IDs 170 and stored fields 160 can be utilized to facilitate querying large and dynamic social media datasets. The distributed log 220 can include topics 410, and data sources 130 including fixed width unique IDs 170. The data sources 130 can be received over time by the distributed log 220 from a social media data stream 210. In some implementations, each data source 130 can be mapped to a topic 410. For example, a topic 410 can be synonymous with a data source 130.

The social media data stream 210 can publish data sources 130 to topics 410 on the distributed log 220. In addition, data sources 130 can be requested (e.g., consumed) from topics 410 on the distributed log 220 by, for example, nodes 310 in the distributed processing cluster 230, the distributed key/value store 240, and/or the like. For example, nodes 310 in the distributed processing cluster 230, the distributed key/value store 240, and/or the like can subscribe to topics 410 on the distributed log, and data sources 130 can be transmitted to the subscribers. The topics 410 can include, for example, a category or feed name to which records can be published. A topic 410 can be multi-subscriber (e.g., one or more subscribers can subscribe to data included in the topic 410).

The data sources 130 can include, for example, a new record, an update of an existing record, and/or a deletion of a record. As such, the distributed log 220 can be the record of truth for the social media dataset. The social media data set can be partitioned (e.g., sharded) by topics 410. In some implementations, the social media data set can be partitioned by data source 130. The ordinal (e.g., fixed width unique ID 170) can be used to align columns and indexes 140. For example, given a record that contains a field A and is assigned an ordinal N, the value for A can be stored at an offset N in a stored field 160 for A.

Figure 3:
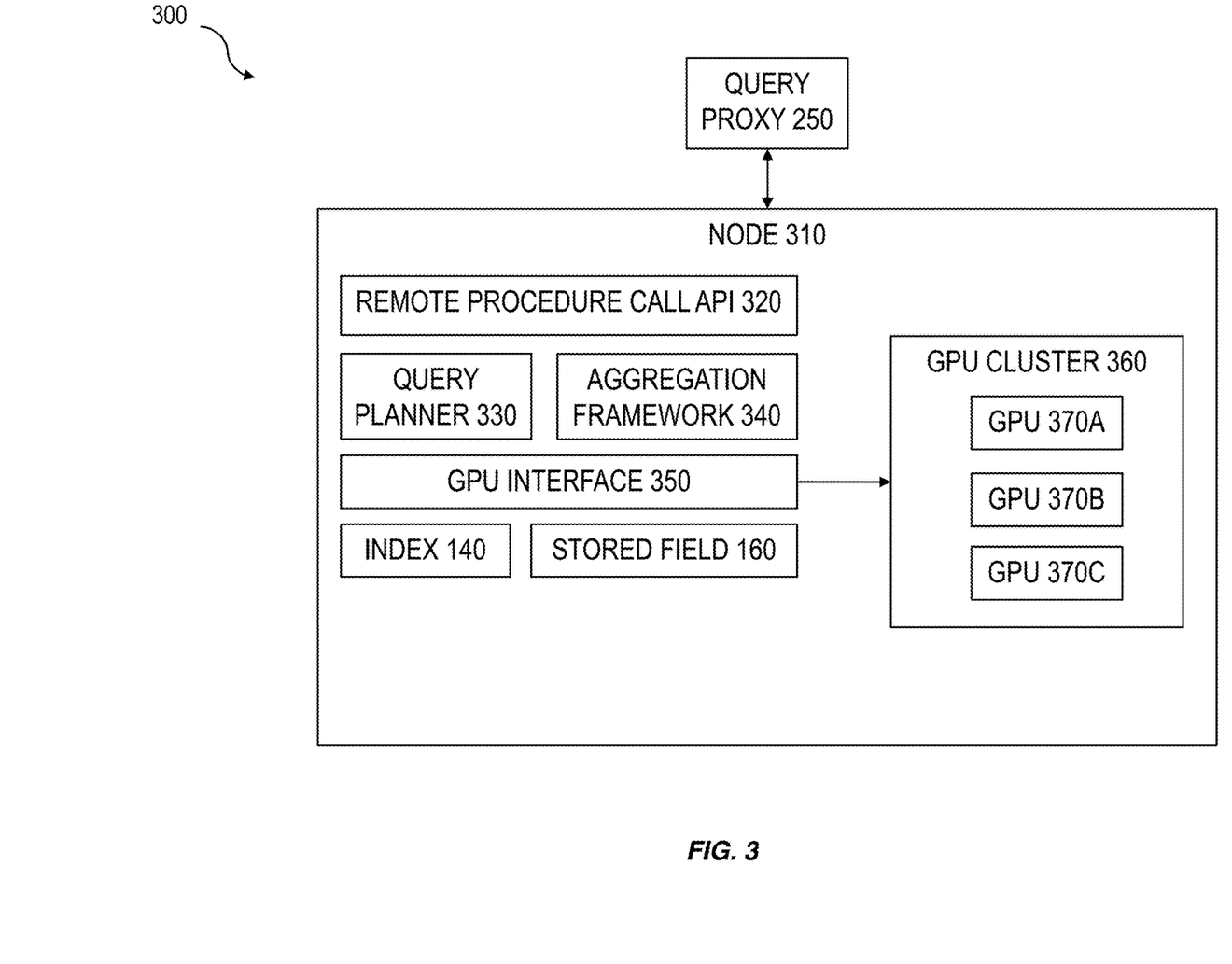
FIG. 3 is a system block diagram illustrating an example implementation of a node.

FIG. 3 is a system block diagram 300 illustrating an example implementation of a node that can facilitate indexing and querying of the social media dataset. By utilizing data sources 130 including fixed width unique IDs 170 and stored fields 160, the example implementation of the node 310 can facilitate querying large and dynamic social media datasets. The node 310 can include a remote procedure call application programming interface (API), a query planner, an aggregation framework, a graphics processing unit (GPU) interface, a GPU cluster including one or more GPUs, indexes 140, and stored fields 160.

Nodes 310 in the distributed processing cluster 230 can, for example, subscribe to one or more topics 410 on the distributed log 220. The node 310 can be a leader node 260 (e.g., first node) and/or a worker node 270 (e.g., second node). The remote procedure call API 320 can facilitate the execution of operations in different address spaces. For example, some operations can be executed on hardware that can be remote, such as a leader node 260, a worker node 270, and/or the like. The remote hardware can include remote address spaces. The remote procedure call API 320 can allow for interaction with remote address spaces and can treat such interactions as local interactions (e.g., interactions occurring on a single machine, namespace, and/or the like).

The query planner 330 can determine operations that can execute a query (e.g., a second query) by a node 310. Similarly, the aggregation framework 340 can determine operations that can execute an aggregation, for example, after the execution of a query planned by the query planner 330. The query planner 330 and the aggregation framework 340 can determine plans and/or operations that can be executed on a GPU 370.

The GPU interface 350 can offload operations that can execute query and/or aggregation to one or more GPU's 370 in a GPU cluster 360 (e.g., local on a node 310), and those operations can be performed (e.g., executed) at the GPU's 370. For example, compute unified device architecture (CUDA) can be utilized with optimized algorithms performed on data transmitted to the GPU's 670. The results of the performed operations can, for example, be received by the GPU interface 350 and can be provided to the query proxy 250 to be included in the result of the query and/or aggregation.

Queries and/or aggregations can include data retrieval. Indexes 140 can improve the speed of data retrieval by quickly locating data. The indexes 140 can include bitmap indexes, free text search indexes, interval indexes, and log structured merge tree indexes. Bitmap indexes can be used for indexes 140 that include few unique values (e.g., low cardinality indexes). For example, the gender of a profile can be represented as a bit (e.g., male or female) in a bitmap. The ordinal (e.g., fixed width unique ID 170) of a profile can act as an offset in the bitmap index and can uniquely identify the entity in the bitmap index.

A query can include various attributes (e.g., interests, gender, location, occupation, categorical data, and/or the like) and the attributes can combined with bitwise operations (e.g., first binary operation, second binary operation, and/or the like). For example, a query can include (find all profiles that are a male AND in Brighton OR a pilot). An index 140 (e.g., first index 140, second index 140, and/or the like) can correspond to an attribute (e.g., first attribute, second attribute, and/or the like). The bitwise operation (e.g., first binary operation, second binary operation, and/or the like) can be executed between the indexes 140 (e.g., first index 140, second index 140, and/or the like) and can result in an index 140 (e.g, third index 140, and/or the like). The result of the query can include this index 140 (e.g., third index).

Free text search indexes can include free text mapped to records. For example, a tweet, with ID "6" can include the text "this is an #example" in its body. In a free text search index, the keys can include text, such as "this", "is", "an" and "example," and the values can include the ID of the entity including the text, such as "6." Free text search indexes can facilitate the fast execution of textual queries. Interval indexes (e.g., time series indexes) can include the minimum and maximum values that can be included in a sequence (e.g., a block) of records. For example, an interval index can facilitate executing a range query (e.g., given a range [x to y], blocks of records can be skipped if the minimum value is greater than y or the maximum value is less than x). Log structured merge tree indexes (e.g., log structured merge trees) can include variable width data that can be used in aggregations.

The stored field 160 can include fixed width data. For example, variable width data such as text can be converted to a fixed width representation by, for example, assigning a unique 64 bit integer to each unique value. The assignments can be stored in a log structured merge tree and the fixed width integer can be stored in a stored field 160. Stored fields 160 can be addressed directly by array indices. In addition, stored fields 160 can be addressed in bulk. Indexes 140 and stored fields 160 can be maintained in memory (e.g., stored in memory, such as random access memory (RAM) that can facilitate data transfer speeds substantially faster than hard disk drives).

Figure 5:
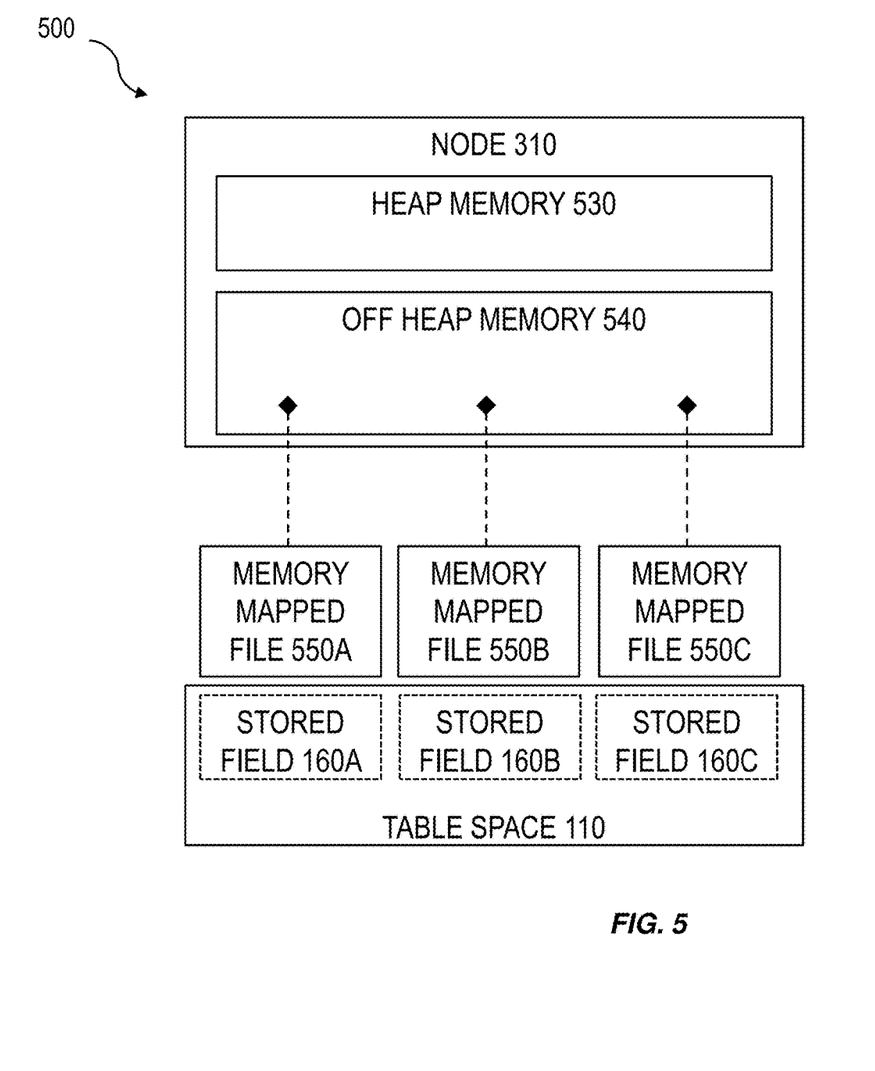
FIG. 5 is a system block diagram illustrating an example mapping of a tablespace to memory.

FIG. 5 is a system block diagram 500 of a node 310 and memory illustrating mapping data to memory. The node 310 can include heap memory and off heap memory. Additionally, a memory mapped file can map stored fields 160 to off heap memory. Utilizing memory (e.g., off heap memory) to operate on data sources 140 including fixed width unique IDs 170 and stored fields 160 can facilitate querying large and dynamic social media datasets.

Heap memory 530 can include objects stored in a Java heap (e.g., subject to garbage collection). For example, the raw data "8 CHARS!" can be represented in 16 bytes. However, when stored as a Java string object, "8 CHARS!" can require 64 bytes. Off heap memory 540 can facilitate representing billions of dataset records without the overhead of heap memory 530. However, data can be stored temporarily on memory (e.g., data not persisted on memory).

When a node 310 fails, restarts, and/or the like, the data (e.g. social media dataset records, tablespaces 110, partitions 120, datasources 130, indexes 140, fields 150, stored fields 160, fixed width unique IDs 170, and/or the like) stored in memory of that node 310 can be temporarily lost. For example, the data can be stored in disk. But, retrieving data can from disk can be slow. As such, the contents of the tablespace 110 can be mapped transparently to the address space of an application using memory mapped files 550 and can be kept in a kernel page cache. Consequently, the records included in the tablespace 110 can be included in the off heap memory 540. When a process is reloaded, a memory mapped file 550 can quickly load the tablespace 110 into the off heap memory.

Figure 6:
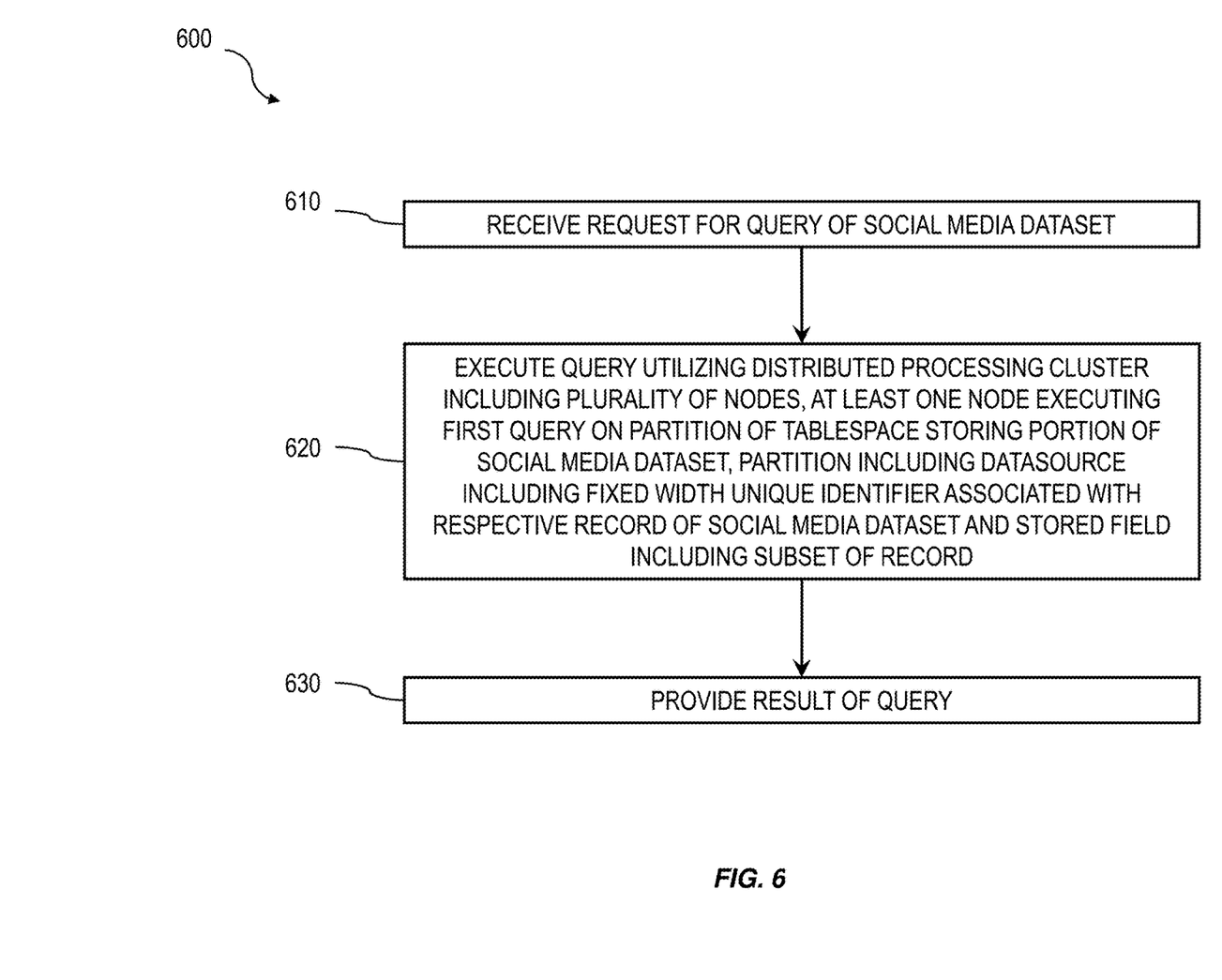
FIG. 6 is a process flow diagram illustrating an example process of querying a social media dataset.

FIG. 6 is a process flow diagram illustrating an example process of querying a social media dataset. By utilizing data sources 130 including fixed width unique IDs 170 and stored fields 160, the example process can facilitate querying large and dynamic social media datasets. For example, the process can utilize tablespaces 110, partitions 120, data sources 130, indexes 140, fields 150, stored fields 160, fixed width unique IDs 170 and/or the like; social media data streams 210, distributed logs 220, distributed processing clusters 230, distributed key/value stores 240, query proxies 250, leader nodes 260, worker nodes 270, and/or the like; nodes 310, remote procedure call APIs 320, query planners 330, aggregation frameworks 340, GPU interfaces 350, GPU clusters 360, GPUs 370, and/or the like; topics 410 received over time; and memory, heap memory 530, off heap memory 540, memory mapped files 550, and/or the like.

At 610, a request can be received. The request can be received by a query proxy 250 and/or from a client application 280. The request can include data characterizing a query of a social media dataset. The query can include, for example, portions of interest of entities in the social media dataset. A query planner 330 can create a query plan for the query. For example, the query plan can direct a GPU interface 350 to transmit data sources 130 including indexes 140, stored fields 160, and/or fixed width unique IDs 170 to the GPU cluster 360 for execution on the GPUs 370.

At 620, the query can be executed. A distributed processing cluster 230 can be utilized to execute the query. The distributed processing cluster 230 can include one or more nodes 310 including a first node (e.g. leader node 260 and/or worker node 270) and/or a second node (e.g., leader node 260 and/or worker node 270). At least one node 310 (e.g., a first node, a second node, and/or the like) can execute a partial query (e.g., a first query) on a partition 120 of a tablespace 110 that can store a portion of the social media dataset. The partition 120 can include a data source 130 that can include a fixed width unique identifier 170 (e.g., an ordinal) that can be associated with a respective record of the social media dataset and a stored field 160 that can include a portion of the respective record of the social media dataset.

At 630, the result of the query can be provided. The result of the query can include fixed width unique IDs 170 associated with query criteria, such as attributes that can be queried for, including, for example, operations between partial query results. Providing can include, for example, transmitting the result of the query to a client application 280, query proxy, 250, distributed log 220, distributed processing cluster 230, distributed key/value store 240, GPU interface 350, node 310, and/or the like.

Aggregations can be performed on records in the result of the query. An aggregation can include top-n aggregations and histogram aggregations. With respect to top-n aggregations, for example, a range of record can include the following example values {12, 4, 12, 8, 3, 6, 14, 43, 12, 8, 7}. The unique values in such a range of records can include {12, 4, 8, 3, 6, 14, 43, 7}. The sorted values in such a range of records can include {3, 4, 6, 7, 8, 12, 14, 43}. In the example, a result for a top-3 aggregation can include {43, 14, 12}.

Top-n aggregations can include identifying a range of records from a first interval index; copying the fixed width unique IDs 170 (e.g., first fixed width unique identifier vector) and timestamps (e.g., first timestamp vector) of the identified range of records as vectors to memory; copying (e.g., transmitting) the first fixed width unique identifier vector and the first time stamp vector to a GPU 370 of the distributed processing cluster 230. The aggregation can further include operations performed on the GPU 270 (e.g., utilizing CUDA). The operations performed on the GPU 370 can include filtering the first fixed width unique identifier vector and the first timestamp vector by timestamp and pruning at least one entry lying outside an expected time range; discarding the first timestamp vector; sorting the pruned first fixed width unique identifier vector in place; reducing the sorted first fixed width unique identifier vector, the reducing including counting a number of duplicates of a first fixed unique identifier in the first fixed width unique identifier vector; creating a second fixed width unique identifier vector and a count vector, the second fixed width unique identifier vector including the reduced sorted first fixed width unique identifier vector and the count vector including the number of duplicates of the first fixed width unique identifier vector; sorting the second fixed width unique identifier vector by utilizing the count vector; and providing a predetermined length prefix of the sorted second fixed width unique identifier vector. The predetermined length prefix of the sorted second fixed width unique identifier vector can then be transmitted by the GPU 370 to, for example, the query proxy 250, a node 310 (e.g., first node, second node, and/or the like), and/or the GPU interface 350.

With respect to histogram aggregations, for example, 8 bins can be determined from the number of unique values in the range of example records {12, 4, 12, 8, 3, 6, 14, 43, 12, 8, 7}. The bin to value mapping can include {bin 0: value 3, bin 1: value 4, bin 2: value 6, bin 3: value 7, bin 4: value 8, bin 5: value 12, bin 6: value 14, bin 7: value 43}. A histogram aggregation can include the count of each value in a corresponding bin, such as, {bin 0: count 1, bin 1: count 1, bin 2: count 1, bin 3: count 1, bin 4: count 2, bin 5: count 3, bin 6: count 1, bin 7: count 1}.

Histogram aggregations can include creating a first value vector including a plurality of values. In some implementations, the first value vector can be copied to a GPU 370, and operations can be performed by the GPU 370. The operations can include calculating, in parallel, a minimum value of the first value vector, a maximum value of the first value vector, and a number of histogram bins corresponding to a number of unique values in the first value vector; transforming, in place and in parallel, the plurality of values in the first value vector into respective histogram bin values, sorting the transformed first value vector; computing, in parallel, a plurality of end indices of the histogram bin values in the transformed first value vector; creating an end index vector including the plurality of end indices of the histogram bin values; calculating a difference between adjacent entries of the end index vector returning a bin count vector and providing the bin count vector. In some implementations, the bin count vector can be transmitted to, for example, the query proxy 250, a node 310 (e.g., first node, second node, and/or the like), and/or the GPU interface 350.

For example, with respect to query planning, creating the initial vectors can be time intensive, and transferring them over the peripheral component interconnect express (PCIe) bus to the GPU 370 can also take time. For small datasets, it can be more efficient to perform operations elsewhere, for example, it can be more efficient to execute a query on the CPU rather than incur the cost overhead of sending the data over the PCIe bus. However, it can be worthwhile to perform small dataset operations on GPU's 370 if, for example, a series of CUDA operations can be pipelined (e.g., the GPU allows the next instructions for the series of operations to be fetched while the GPU is performing current operations, holding the instructions in a local GPU buffer until the series of operations can be performed) against the same data. The query planner 330 can work out an effective way of executing a query and the plan can be executed. Executing a query plan can involve a series of index, scan, sort, and/or aggregation operations.

Indexes 140 and scans can emit sparse bitmaps that can indicate which records match a given query. These bitmaps can be combined using set (e.g., union (bitwise OR), intersection (bitwise AND), and/or the like) operations, and can build up complex boolean style queries. Data joins, including inner and outer join types, can be executed when the data can be collocated on a partition 120.

The results (e.g., result set) of a query (e.g., a query execution, a first query, a second query, and/or the like) can be cached. The complete result set can be cached, and/or a portion of a result of a query that can be executed as a result of a query plan. For example, in the aggregation "top_n (shared_url, 10) FROM tweet_urls WHERE tweeter_id IN (SELECT profileId FROM twitter_profiles WHERE gender=MALE)", which can find the top 10 URL's shared by male Twitter users, the portion of the query plan (e.g., the male Twitter users, any result set, and/or result of a query) can be cached for multiple aggregations. Subsequent aggregations that can include the same portion in their query plan (e.g., the male Twitter users, result set, and/or any result of a query) and can execute much faster.

Although a few variations have been described in detail above, other modifications or additions are possible. For example, in some implementations, all operations can be executed on GPUs 370. In some implementations, custom field-programmable gate arrays (FPGA) can be used with (e.g., concurrent with, along side, and/or the like) GPUs 370 to execute operations. In some implementations, GPUs 370 are not used at all. For example, custom FPGAs can replace GPUs 370 or operations can be executed on a local processor of the node 310.

The subject matter described herein provides many technical advantages. For example, hardware can be utilized more efficiently. Large datasets can be processed in a cost effective manner. Exact aggregations can be performed on very large datasets, rather than, for example, probabilistic and/or approximate aggregations. Performance can scale linearly (e.g., horizontally) by adding additional nodes 310.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
  receiving data characterizing a query of a social media dataset;
  executing the query utilizing a distributed processing cluster including a plurality of nodes, at least one node executing a first query on a partition of a tablespace storing a portion of the social media dataset, the partition including a data source including a fixed width unique identifier and a stored field, the fixed width unique identifier associated with a respective record of the social media dataset and the stored field including a portion of the respective record; and
  providing a result of the query;
  wherein the query includes data characterizing a first attribute, a second attribute, and a first binary operation between the first attribute and the second attribute, the method further comprising:
  receiving data characterizing a first index corresponding to the first attribute and a second index corresponding to the second attribute; and
  determining a third index at least by executing the first binary operation between the first index and the second index, wherein the result of the query includes the third index.

2. The method of claim 1, further comprising:
  receiving, by a first node of the plurality of nodes, a first record;
  determining, by the first node, a first fixed width unique identifier and a first stored field for the first record;
  providing, by the first node and to a second node, the first fixed width unique identifier and the first stored field;
  creating, by the second node, a first data source in a first partition in a first tablespace of the social media dataset; and
  storing, by the second node, the first fixed width unique identifier and the first stored field in the first data source.

3. The method of claim 1, wherein the query is a first query, wherein the first query is received by a query proxy and the method further comprising:
  determining, by the query proxy, a query execution plan of the first query, the query execution plan including a second query;
  transmitting, by the query proxy, the second query to a second node of the distributed processing cluster;
  receiving, by the query proxy, a first result of the executed second query; and
  providing, by the query proxy, the result of the query, wherein the result of the query includes the first result.

4. The method of claim 1, wherein the distributed processing cluster includes at least one graphics processing unit.

5. The method of claim 1, wherein the data source including the fixed width unique identifier and the stored field is maintained in a memory.

6. The method of claim 1, wherein the data source includes at least one record, at least one field including a field type, at least one index mapped to one or more fields of the at least one field, and one or more stored field including a portion of a record of the at least one record.

7. The method of claim 6, wherein the at least one indexes include a bitmap index, a free text search index, an interval index, and/or a log structured merge tree index.

8. The method of claim 7, further comprising:
  identifying a range of records from a first interval index;
  copying a first fixed width unique identifier vector and a first timestamp vector of the range of records to a memory;
  copying the first fixed width unique identifier vector and the first timestamp vector to a graphics processing unit of the distributed processing cluster;
  filtering the first fixed width unique identifier vector and the first timestamp vector by timestamp and pruning at least one entry lying outside an expected time range;
  discarding the first timestamp vector;
  sorting the pruned first fixed width unique identifier vector in place;

reducing the sorted first fixed width unique identifier vector, the reducing including counting a number of duplicates of a first fixed width unique identifier in the first fixed width unique identifier vector;
creating a second fixed width unique identifier vector and a count vector, the second fixed width unique identifier vector including the reduced sorted first fixed width unique identifier vector, and the count vector including the number of duplicates of the first fixed width unique identifier;
sorting the second fixed width unique identifier vector by utilizing the count vector; and
providing a predetermined length prefix of the sorted second fixed width unique identifier vector.

9. The method of claim 7, further comprising:
creating a first value vector including a plurality of values;
calculating, in parallel, a minimum value of the first value vector, a maximum value of the first value vector, and a number of histogram bins corresponding to a number of unique values in the first value vector;
transforming, in place and in parallel, the plurality of values in the first value vector into respective histogram bin values;
sorting the transformed first value vector;
computing, in parallel, a plurality of end indices of the histogram bin values in the transformed first value vector;
creating an end index vector including the plurality of end indices of the histogram bin values;
calculating a difference between adjacent entries of the end index vector returning a bin count vector; and
providing the bin count vector.

10. A system comprising:
at least one data processor;
memory storing instructions which, when executed by the at least one data processor, causes the at least one data processor to perform operations comprising:
receiving data characterizing a query of a social media dataset;
executing the query utilizing a distributed processing cluster including a plurality of nodes, at least one node executing a first query on a partition of a tablespace storing a portion of the social media dataset, the partition including a data source including a fixed width unique identifier and a stored field, the fixed width unique identifier associated with a respective record of the social media dataset and the stored field including a portion of the respective record; and
providing a result of the query;
wherein the query includes data characterizing a first attribute, a second attribute, and a first binary operation between the first attribute and the second attribute, the operations performed by the at least one data processor further comprising:
receiving data characterizing a first index corresponding to the first attribute and a second index corresponding to the second attribute; and
determining a third index at least by executing the first binary operation between the first index and the second index, wherein the result of the query includes the third index.

11. The system of claim 10, wherein the operations performed by the at least one data processor further include:
receiving, by a first node of the plurality of nodes, a first record;
determining, by the first node, a first fixed width unique identifier and a first stored field for the first record;
providing, by the first node and to a second node, the first fixed width unique identifier and the first stored field;
creating, by the second node, a first data source in a first partition in a first tablespace of the social media dataset; and
storing, by the second node, the first fixed width unique identifier and the first stored field in the first data source.

12. The system of claim 10, wherein the query is a first query, wherein the first query is received by a query proxy, and the operations performed by the at least one data processor further include:
determining, by the query proxy, a query execution plan of the first query, the query execution plan including a second query;
transmitting, by the query proxy, the second query to a second node of the distributed processing cluster;
receiving, by the query proxy, a first result of the executed second query; and
providing, by the query proxy, the result of the query, wherein the result of the query includes the first result.

13. The system of claim 10, wherein the distributed processing cluster includes at least one graphics processor unit.

14. The system of claim 10, wherein the data source including the fixed width unique identifier and the stored field is maintained in a memory.

15. The system of claim 10, wherein the data source includes at least one record, at least one field including a field type, at least one index mapped to one or more fields of the at least one field, and one or more stored field including a portion of a record of the at least one record.

16. A non-transitory computer program product storing instructions, which when executed by at least one data processor of at least one computing system, implement operations comprising:
receiving data characterizing a query of a social media dataset;
executing the query utilizing a distributed processing cluster including a plurality of nodes, at least one node executing a first query on a partition of a tablespace storing a portion of the social media dataset, the partition including a data source including a fixed width unique identifier and a stored field, the fixed width unique identifier associated with a respective record of the social media dataset and the stored field including a portion of the respective record; and
providing a result of the query;
wherein the query includes data characterizing a first attribute, a second attribute, and a first binary operation between the first attribute and the second attribute, the operations further comprising:
receiving data characterizing a first index corresponding to the first attribute and a second index corresponding to the second attribute; and
determining a third index at least by executing the first binary operation between the first index and the second index, wherein the result of the query includes the third index.

17. The non-transitory computer program product of claim 16, wherein the operations further comprise:
receiving, by a first node of the plurality of nodes, a first record;
determining, by the first node, a first fixed width unique identifier and a first stored field for the first record;
providing, by the first node and to a second node, the first fixed width unique identifier and the first stored field;

creating, by the second node, a first data source in a first partition in a first tablespace of the social media dataset; and storing, by the second node, the first fixed width unique identifier and the first stored field in the first data source.

18. The non-transitory computer program product of claim 16, wherein the data source including the fixed width unique identifier and the stored field is maintained in a memory.

* * * * *